R. R. TAYLOR.

Steam Hammer.

No. 1,191. Reissued May 21, 1861.

Witnesses:

Henry Howson
Chas Howson

Inventor:

R. R. Taylor

N. PETERS. Photo-Lithographer, Washington, D. C.

UNITED STATES PATENT OFFICE.

ROBERT R. TAYLOR, OF READING, PENNSYLVANIA.

IMPROVED STEAM-HAMMER.

Specification forming part of Letters Patent No. 31,041, dated January 1, 1861; Reissue No. 1,191, dated May 21, 1861.

*To all whom it may concern:*

Be it known that I, ROBERT R. TAYLOR, of Reading, Berks county, Pennsylvania, have invented a new and useful Improvement in Steam-Hammers; and I do hereby declare the following to be a full, clear, and exact description of the same, reference being had to the accompanying drawings, and to the letters of reference marked thereon.

My improvement in steam-hammers consists, first, in combining a vibrating wooden helve with a hammer-block moving in vertical guides, and with a double-acting steam-cylinder connected to the helve at a point between the center of vibration of the helve and the hammer, in the manner described hereinafter, so that all the advantages of a helve-hammer, with none of its usual disadvantages, may be obtained, and so that a mass of wood for absorbing the shocks may intervene between the point where the power is applied to the helve and the fulcrum of the latter, as well as between the point where the power is applied and the hammer.

Secondly, my invention consists in operating the valves by a projection on the helve and a slotted lever with two set-screws, the whole being arranged and operating as set forth hereinafter, so that the valves may have more or less dwell during the movement of the helve, for a purpose hereinafter explained.

In order to enable others skilled in the art to make and use my invention, I will now proceed to describe its construction and operation.

Figure 1:
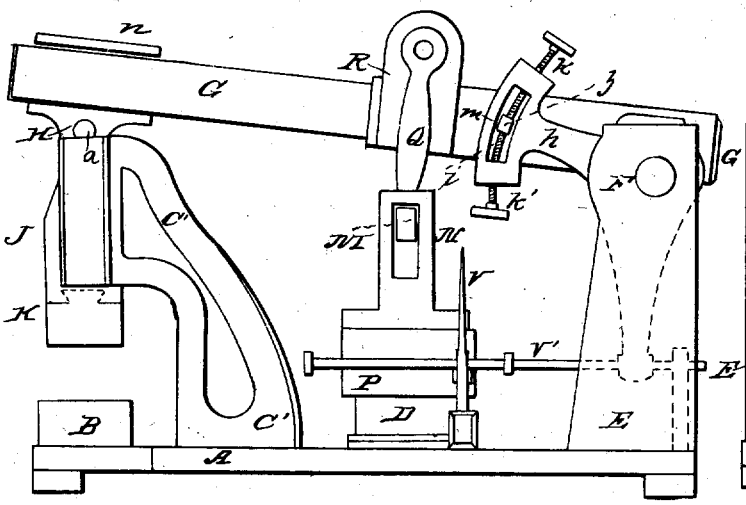
Figure 3:
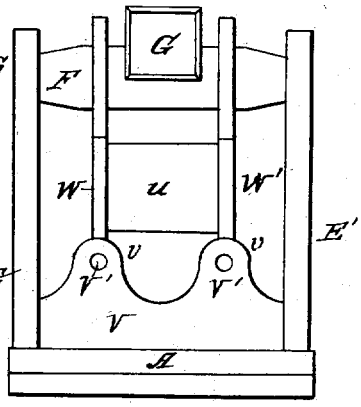
Figure 2:
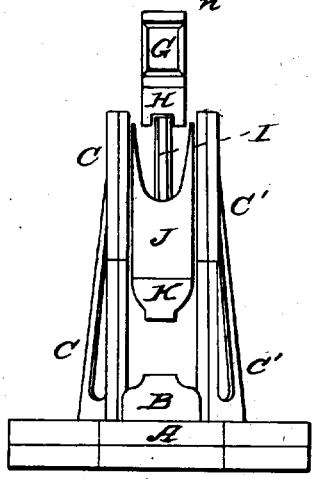
Figure 4:
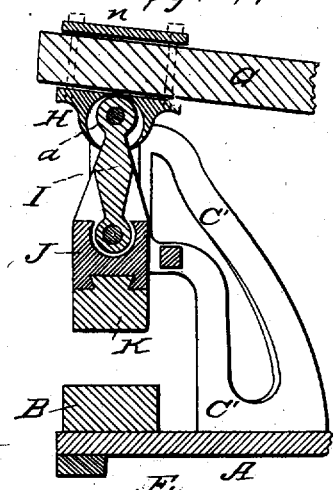

On reference to the accompanying drawings, which form part of this specification, Figure 1 is a side view of my improved steam-hammer; Fig. 2, a front view of the same; Fig. 3, a rear view; Fig. 4, a sectional view of part of Fig. 1, and Fig. 5 a plan view.

Similar letters refer to similar parts throughout the several views.

A is the base-plate of the machine, to which are secured the anvil B, the guide-frames C and C′, the steam-cylinder D, and the rear frames, E and E′. In the upper ends of the latter turn the journals of the shaft F, to which is secured the helve G of the hammer. To the front end and under side of this helve is secured a plate, H, to which is hung the upper end of the connecting-rod I by means of a pin, *a*, which passes through the said rod as well as through the projections on the plate. The lower end of this rod is connected to the hammer-block J, into the under side of which is dovetailed the face K, the latter being situated directly above the anvil B. The block J has two vertical ribs, one on each side, the opposite ribs being arranged to fit snugly, but so as to slide freely in grooves in the opposite frames, C and C′.

The steam-cylinder D is provided with a piston and piston-rod similar to those of an ordinary steam-engine, the rod passing through a stuffing-box in the cover of the cylinder, above which it is connected to the cross-head M, the opposite ends of which pass, one end through one of the guides N and the other through the opposite guide N′, both guides being secured to the top of the steam-cylinder D. To this cross-head M are jointed the the lower ends of the connecting-rods Q and Q′, the upper ends of which are hung to a pin, *b*, passing through a frame, R, which is firmly secured to the helve G of the hammer.

Figure 5:
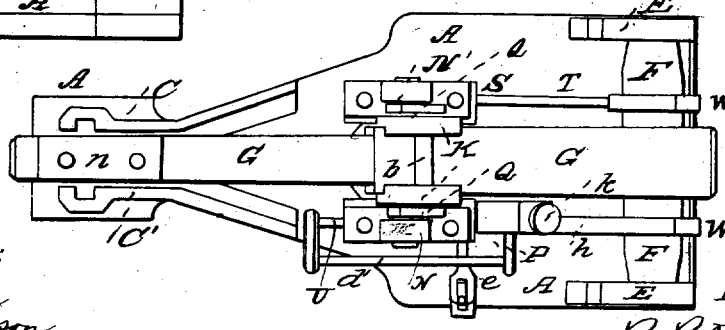

The steam-cylinder is provided on one side with a steam-chest, S, Fig. 5, having an ordinary slide-valve connected to a spindle, T, and so constructed and arranged that by the movement of the said spindle the steam may be let into the cylinder above and below its piston alternately. On the opposite side of the cylinder is a chest, P, containing two exhaust-valves, operated by two different spindles, U and U′, connected together by a rod, *d*, as seen in Fig. 5. A lever, V, jointed to the bed A of the machine, has a rod, *e*, projecting into the exhaust-chest P, and provided with a valve so as to prevent the escape of the exhaust-steam by the movement of the lever.

On the movement of the valves, which are similar to the ordinary slide-valves of steam-engines, a reciprocating motion is communicated to the piston-rod, and consequently a vibrating motion is imparted to the helve G, the force of the steam acting alike to raise the hammer and to bring it down with a blow, the force of which depends upon the pressure of the steam, the area of the cylinder's piston, and upon the movement of the valves.

By operating the lever V and thereby obstructing the passage of the exhaust-steam from the cylinder the movement of the helve may be instantly arrested at any point. The two valve-spindles U′ and T pass through and are guided by projections *v v*, on a plate, V, secured between the two frames E and E′, the valve-spindle U′ being connected to the lower end of the arm W and the valve-spindle T to the arm W′, and both arms being connected together by a bar, *w*, so that they may move in unison. The upper ends of both arms are hung loosely to the shaft F, which forms the fulcrum of the helve G, and from the arm *w* projects another arm, *h*, on the enlarged end *m* of which is a curved slot, *i*, for receiving the pin *j*, which is secured to the side of the helve G. Two set-screws, *k* and *k′*, pass through the opposite ends of the enlargement *m* of the arm *h*, the screws penetrating to a greater or less extent into the curved slot *i*, according to their adjustment.

The plate H is screwed to the under side of the helve by bolts, (shown in dotted lines,) said bolts passing through the helve and through a plate, *n*, situated above the helve, as seen in Fig. 4. When the set-screws *k* and *k′* are adjusted as seen in Fig. 1, so that their points shall bear one on one side and the other on the opposite side of the projection *j* of the helve, it will be evident that whatever may be the extent of the movement of this projection consequent upon the vibration of the helve through the action of the steam-cylinder the same extent of movement will be imparted to the arm *h*, through which and the arms W and W′ a reciprocating motion simultaneous with the vibration of the helve is imparted to the valve-spindles U′ and T and to their respective valves.

It will be evident that the farther the points of the screw are adjusted from the projection *j*, or, in other words, the more play the projection is allowed between the points of the screw, the more extended will be the movement of the helve before the valves are moved, and consequently the extent of the rise and fall of the hammer depends upon the amount of the dwell allowed to the valves by the adjustment of the screws, which are such that the upward movement can be regulated independently of the downward movement, and vice versa.

The great defect in an ordinary helve-hammer is that its face presents a variable angle, according to the thickness of metal submitted to its action. As the hammer-block J moves in vertical guides in the frame, it will be evident that its face must be always level and parallel with the face of the anvil, no matter what thickness of metal may interfere between the two.

The importance of connecting the piston-rod to the wooden helve at a point between the fulcrum and the hammer will be understood when it is observed that a mass of wood for absorbing the inordinate shocks to which the machine is submitted intervenes between the fulcrum of the helve and the point where the power is applied, as well as between the latter point and the hammer.

I wish it to be understood that I do not claim, broadly, a hammer moving in vertical guides in combination with a lever, as such a device is seen in the patent of J. L. Morris, January 31, 1854; nor do I claim operating the valves from the helve by an arm the position of which in respect to the helve may be altered at pleasure; but

I claim as my invention and desire to secure by Letters Patent—

1. Combining the vibrating wooden helve G with the hammer-block moving in vertical guides and with a double-acting steam-cylinder, when the latter is connected to the wooden helve at a point between the center of the helve's vibration and the hammer, as and for the purpose herein set forth.

2. Operating both exhaust and steam valves by means of the projections *j* on the helve and the slotted lever *h*, with its adjustable set screws *k* and *k′*, the whole being arranged and operating as herein set forth, for the purpose specified.

In testimony whereof I have signed my name to this specification before two subscribing witnesses.

Witnesses: R. R. TAYLOR.

HENRY HOWSON,
JOHN WHITE.